(12) United States Patent
Tadd et al.

(10) Patent No.: US 8,440,107 B2
(45) Date of Patent: May 14, 2013

(54) CATALYTIC REFORMING METHODS

(75) Inventors: Andrew R. Tadd, Saline, MI (US); Johannes Schwank, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 191 days.

(21) Appl. No.: 12/952,873

(22) Filed: Nov. 23, 2010

(65) Prior Publication Data

US 2011/0121239 A1 May 26, 2011

Related U.S. Application Data

(60) Provisional application No. 61/264,150, filed on Nov. 24, 2009.

(51) Int. Cl.
*C01B 3/38* (2006.01)
*C01B 3/24* (2006.01)

(52) U.S. Cl.
USPC .......................................... 252/373; 423/650

(58) Field of Classification Search ................... 252/373
See application file for complete search history.

(56) References Cited

U.S. PATENT DOCUMENTS

| 4,181,503 | A  | * | 1/1980  | Lesieur et al. | ................ | 48/127.7 |
| 2002/0178806 | A1 | * | 12/2002 | Valentine | ........................ | 73/195 |
| 2010/0028229 | A1 | * | 2/2010  | Carnell et al. | ................ | 423/219 |

* cited by examiner

*Primary Examiner* — Melvin C. Mayes
*Assistant Examiner* — Kenneth Vaden
(74) *Attorney, Agent, or Firm* — Dierker & Associates, P.C.

(57) ABSTRACT

A catalytic reforming method is disclosed herein. The method includes sequentially supplying a plurality of feedstocks of variable compositions to a reformer. The method further includes adding a respective predetermined co-reactant to each of the plurality of feedstocks to obtain a substantially constant output from the reformer for the plurality of feedstocks. The respective predetermined co-reactant is based on a C/H/O atomic composition for a respective one of the plurality of feedstocks and a predetermined C/H/O atomic composition for the substantially constant output.

12 Claims, 6 Drawing Sheets

CATALYTIC REFORMING METHODS

CROSS-REFERENCE TO RELATED APPLICATIONS

This application claims the benefit of U.S. Provisional Patent Application Ser. No. 61/264,150, filed Nov. 24, 2009, entitled "Catalytic Reforming Methods".

STATEMENT REGARDING FEDERALLY SPONSORED RESEARCH OR DEVELOPMENT

This invention was made in the course of research supported by a grant from the Department of Energy (DOE), Grant No. DE-FC26-06NT42813. The U.S. government has certain rights in the invention.

BACKGROUND

The present disclosure relates generally to catalytic reforming methods.

Alternate sources of energy, fuels, and chemicals are of great interest. Gasification of resources (such as coal, biomass, or mixtures of the two) has been suggested as a source of syngas, a mixture of CO and $H_2$. Syngas can be used for a variety of applications, for example, in fuel production (Fischer-Tropsch synthesis, methanol synthesis), as a feed stock for $H_2$ production (via water gas shift), as a direct energy source, or as a fuel stream for high temperature solid oxide fuel cells. Generally, gasification processes are designed around a single feed stock (e.g., coal, agricultural, waste, pulping waste, etc.) and are performed on a large ($MW_{th}$) scale.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Variability in feed stock generally leads to variability in gasifier output (i.e., the relative quantities of hydrogen, carbon monoxide, and carbon dioxide in the syngas products varies). In some instances, the type and quantity of hydrocarbons in the products may also vary; and the removal of such hydrocarbons via a catalytic reforming step may be desirable.

The present inventors have found an operational strategy to smooth the syngas product composition so that downstream processes are not affected by feedstock switching. As such, examples of the method disclosed herein enable substantially constant product compositions to be obtained during a reforming process in which varying gasification feed stocks are utilized. In one example, substantially constant means that the component concentrations are within ±5 volume % on an $N_2$-free basis, even when inputs are varied by greater than 10%. It is to be understood, however, that when air is used as an $O_2$ source in the method disclosed herein, the compositions which are held constant are the non-$N_2$ parts, and adding quantities of $O_2$ (and $N_2$ by necessity) dilutes everything and thus the component concentrations may exceed the +/−5 volume % limit. The ability to readily switch between different feedstocks may ease commercialization of small gasifier-based energy and fuel systems. Furthermore, the examples of the method disclosed herein may be performed on smaller scales (e.g., in terms of kilowatt thermal, $kW_{th}$), which may improve the economics for operation on biomass, or on larger scales (e.g., from hundreds of kW to MW), where stable product compositions may also be desirable.

Figure 1:
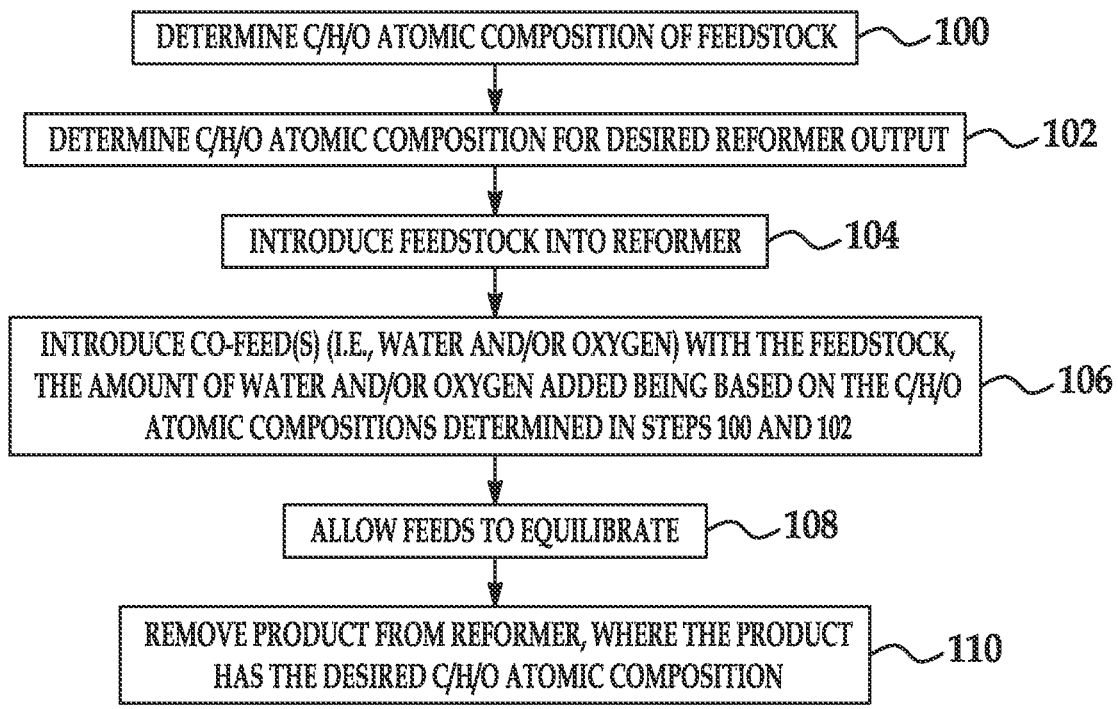
FIG. 1 is a flow diagram illustrating an example of the catalytic reforming method.

Referring now to FIG. 1, an example of the reforming method is depicted. At the outset, the method includes determining the C (carbon)/H (hydrogen)/O (oxygen) atomic composition of the feedstock(s) to be reformed (as shown at reference numeral 100), and determining the C/H/O atomic composition of the desired output or product (as shown at reference numeral 102).

Table 1 presents product compositions of various gasifier designs using a variety of feedstocks. As is evident from Table 1, the species compositions vary over a wide range.

TABLE 1

Composition of gasifier product from different processes using various feedstocks.[1]

| Process | Mole percent, in dry synthesis gas product | | | | | | | | | | |
|---|---|---|---|---|---|---|---|---|---|---|---|
| | $CO_2$ | CO | $H_2$ | $CH_4$ | $C_nH_m$ | $C_2H_4$ | $C_2H_6$ | Ar | $N_2$ | $H_2S + COS$ | $NH_3$ |
| urgi dry bottom coal | 30.9 | 15.2 | 42.2 | 8.6 | 0.8 | 0 | 0 | 0 | 0.7 | 1.3 | 0.4 |
| BGL coal | 3.5 | 54.9 | 31.5 | 4.5 | 0.5 | 0 | 0 | 0 | 3.4 | 1.3 | 0.4 |
| Ruhr 100 coal | 29.5 | 18.1 | 35.1 | 15.8 | 1.0 | 0 | 0 | 0 | 0.4 | 0 ($H_2S$) | 0 |
| Fluid bed, biomass Air | 6.7 | 31 | 18.9 | 2.1 | 0 | 0 | 0 | 0.5 | 40.8 | 0.1 | 0 |
| Fluid bed, lignite $O_2$/steam | 6.2 | 56.7 | 32.8 | 2.6 | 0 | 0 | 0 | 0.6 | 0.9 | 0.2 | 0 |
| Fluid bed, Bit. $O_2$/steam | 5.3 | 52 | 37.3 | 3.5 | 0 | 0 | 0 | 0.6 | 1.0 | 0.3 | 0 |
| Fluid bed, Bit. Air | 1.9 | 30.7 | 18.7 | 0.9 | 0 | 0 | 0 | 0.6 | 47 | 0.2 | 0 |
| Entrained flow, browncoal | 8.0 | 61.0 | 29.0 | 0 | 0 | 0 | 0 | 1.0 | 1.0 | 0.2 | 0 |
| Entrained flow, lignite | 10.0 | 62.0 | 26.0 | 0 | 0 | 0 | 0 | 1.0 | 1.0 | 0.1 | 0 |
| Entrained flow, anthracite | 1.0 | 65.0 | 31.0 | 0 | 0 | 0 | 0 | 1.0 | 1.0 | 0.2 | 0 |
| GEE Oil gasification, NG | 2.6 | 35 | 61.1 | 0.3 | 0 | 0 | 0 | 1.0 | 0 | 0 | 0 |
| GEE Oil gasification, Naphtha | 2.7 | 45.3 | 51.2 | 0.7 | 0 | 0 | 0 | 0.1 | 0 | 0 | 0 |
| GEE Oil gasification, Heavy oil | 5.7 | 47.5 | 45.8 | 0.5 | 0 | 0 | 0 | 0.3 | 0.3 | 0 | 0 |
| GEE Oil gasification, Tar | 5.7 | 54.3 | 38.9 | 0.1 | 0 | 0 | 0 | 0.8 | 0.2 | 0 | 0 |
| SilvaGas (Batelle) biomass | 12.2 | 44.4 | 22.0 | 15.6 | 0 | 5.1 | 0.7 | 0 | 0 | 0 | 0 |
| FICFB | 20.0 | 25.0 | 37.5 | 10.0 | 0 | 0 | 0 | 0 | 4.0 | 0 | 0 |

[1]Higman, C.; van der Burgt, M., Gasification. Gulf Professional Publishing: Amsterdam, 2008.

Figure 2:
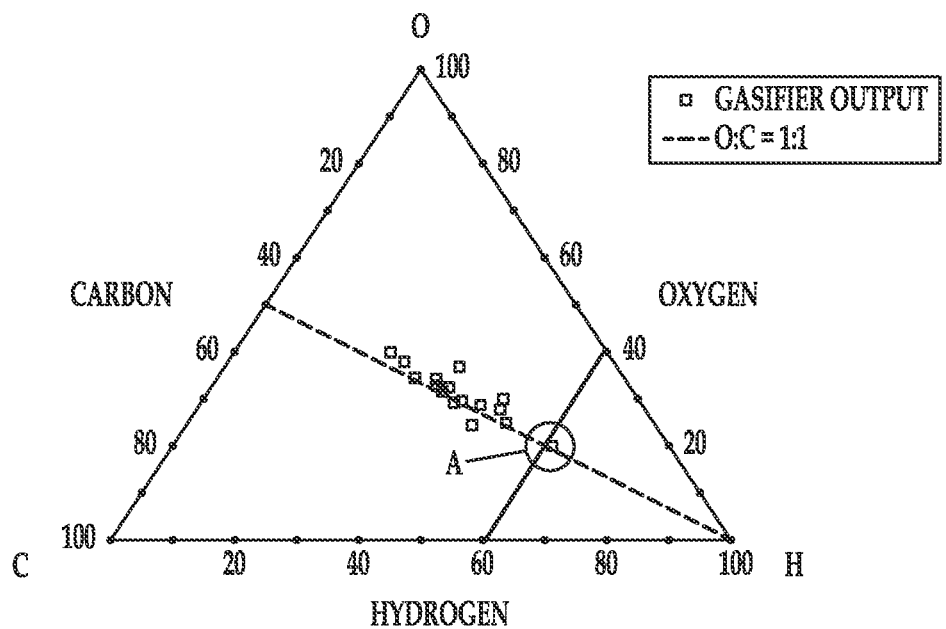
FIG. 2 is a ternary C/H/O diagram illustrating the C/H/O composition of the gasifier products from the processes shown in Table 1.

FIG. 2 illustrates the atomic compositions of the same feedstocks of Table 1 on a ternary C/H/O diagram. In such plots, the far left point represents pure carbon (i.e., 100% C), while the top most point represents pure oxygen (i.e., 100% O), and the far right point represents pure hydrogen (i.e., 100% H). While the species compositions vary over a wide range, the atomic compositions of the gasifier products lie close to the line of equal C—O composition (with varying H composition). As such, the variable in the atomic composition is the H content, which is linked to the gasification feedstock. Natural gas has the highest H content, while coals have the lowest H content. Without being bound to any theory, it is believed that each gasifier is operated with the goal of optimizing syngas output. Adding oxygen beyond an O:C ratio of 1:1 lowers the energy value of the product, and thus the most desirable syngas yields will necessarily be at output compositions of nearly equal O:C.

Figure 3:
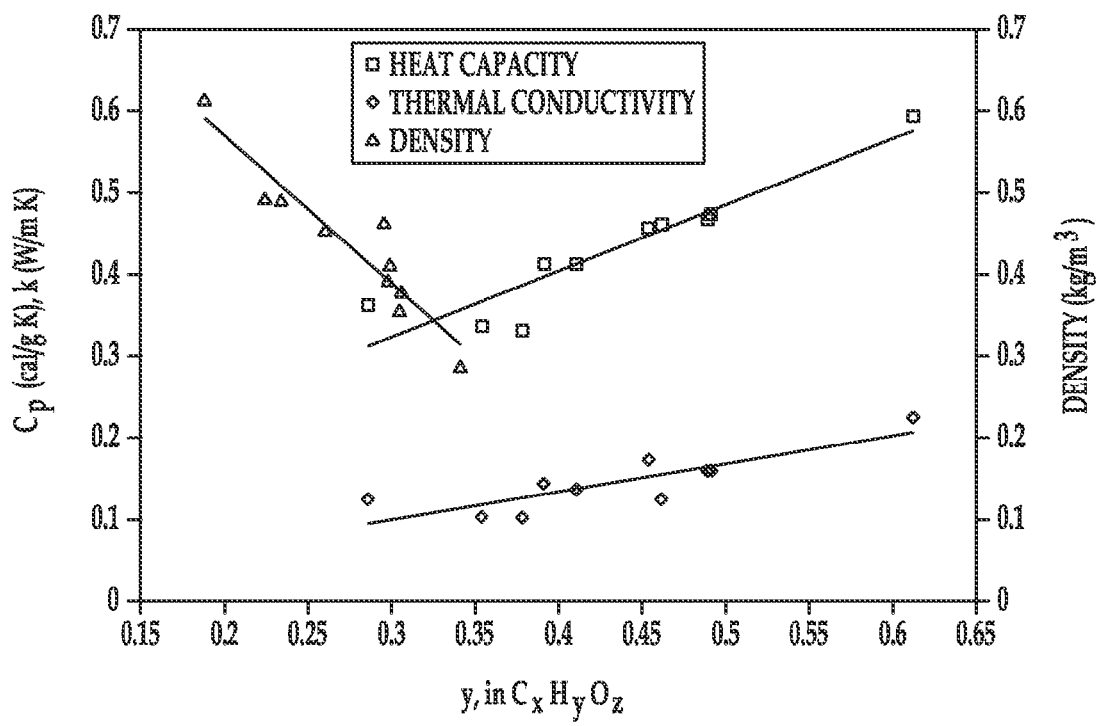
FIG. 3 is a graph illustrating the dependence of heat capacity, thermal conductivity, and density on H-component of C/H/O composition for mixture compositions given in Table 1.

In one example, the feedstock C/H/O atomic composition may be determined via gas chromatography. In another example, physical properties of the gasifier product may be used to determine the feedstock C/H/O atomic composition. As mentioned previously, the C:O ratio of different gasifier outputs is close to 1, and thus an assumption may be made that C:O equals 1. As such, the H content is the variable that must be determined. FIG. 3 illustrates the dependence of feed gas heat capacity, thermal conductivity, and density on the H component of the $C_xH_yO_z$ feed composition. As illustrated, each of these properties shows a reasonable correlation with the H composition in $C_xH_yO_z$. As such, in order to determine the C/H/O composition of any feedstock, the feed gas heat capacity, thermal conductivity, or density is measured. Any suitable techniques may be used to make the measurement(s). In one example, the gas heat capacity is measured by adding a specific amount of heat (e.g., through an electrical resistance heater) to a slipstream of the feed gas and measuring the resulting temperature. Since the heat input is fixed, the temperature rise is dependent on the mixture heat capacity. As other examples, thermal conductivity can be measured by a Wheatstone bridge thermal conductivity detector, a Katharometer, or a hot wire immersed in the gas flow. In still another example, gas density can be measured with a Coriolis meter. From any of these measurements (as shown in FIG. 3), the hydrogen atomic composition may be determined. For example, when the density of the feedstock is about 0.4 kg/m³, the atomic composition of hydrogen may be estimated as 0.3, thus resulting in carbon and oxygen atomic compositions of 0.35 (because C:O is assumed to be 1:1). In one example, thermal conductivity may be a particularly desirable property to measure to determine the H atomic composition, at least in part because it is a relatively simple measurement to make. The use of the properties listed herein provides a method to estimate the C/H/O atomic composition of reformer feed gas in a continuous, real-time manner, which is desirable for a reforming system coupled to a flexible feedstock reformer.

Referring back to FIG. 2, the atomic compositions of the gasifier products of Table 1 have an O:C ratio of approximately 1:1. The small dashed line in FIG. 2 represents the 1:1 ratio of C:O. For illustrative purposes, point A along the small dashed line has 60% hydrogen, and 20% of each of carbon and oxygen. To determine the H atomic composition, a point (e.g., point A) is selected, and a line parallel to the carbon axis is drawn through the point (see the solid line in FIG. 2). The intersection of the parallel line through the hydrogen axis of the ternary diagram represents the percentage of hydrogen (in this example, 60%). Since the total composition is 100%, the remaining 40% is divided by 2 to determine the O and C compositions, since they are equal.

The atomic composition of the gasifier product is the same as the gasifier input (i.e., feedstock). As such, the atomic composition of the product may be adjusted by adding water, oxygen, or a combination of the two to the feedstock prior to introduction into a reformer. The overall atomic composition of the feedstock may be used to set any co-feeds (i.e., water and/or oxygen feeds) during the reforming process to generate a product having a consistent and desirable atomic composition. More particularly, by knowing the initial feedstock atomic composition and the desired output atomic composition, one can adjust the co-feeds to alter the atomic composition during reforming to obtain a constant product. Such steps are illustrated at reference numerals 104 and 106 of FIG. 1, namely that the feedstock and any co-feeds are added to the reformer. In one example, the feeds are added to the reformer simultaneously.

It is to be understood that any reformer may be utilized as long as the reformer contains an appropriate catalyst in a sufficient quantity. Examples of suitable reformers include a packed bed catalytic reformer, a monolith- or structured-catalyst reformer (similar to automotive emissions catalytic converters), or a fluidized bed catalytic reformer.

Figure 4:
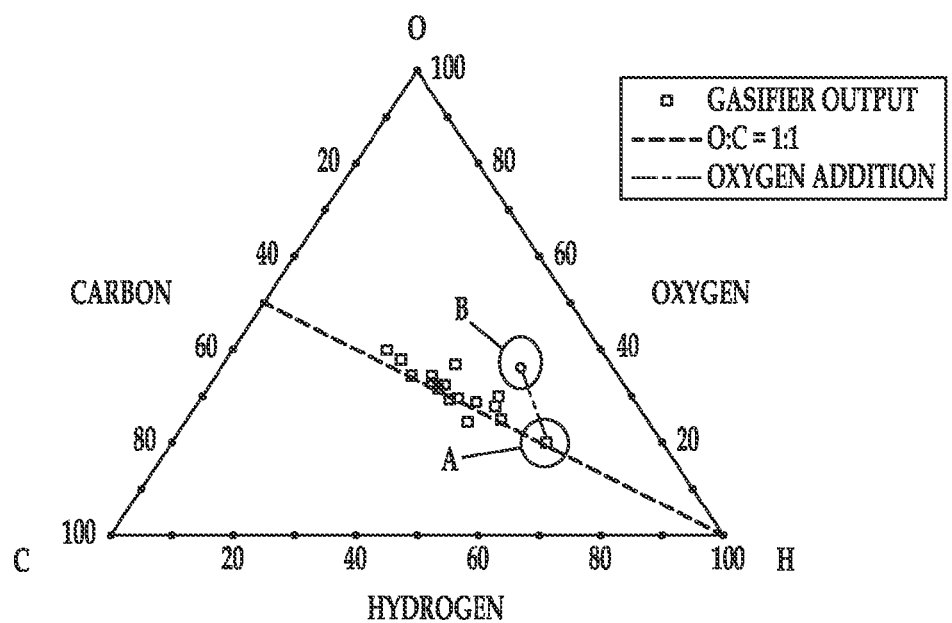
FIG. 4 is a ternary C/H/O diagram illustrating the effect that the addition of $O_2$ to an H-rich feedstock has on the C/H/O composition of one of the gasifier products towards the oxygen vertex.

The addition of oxygen alone moves the composition along a line connecting the feedstock composition with the pure oxygen point/vertex on the ternary diagram. FIG. 4 illustrates the addition of oxygen to the hydrogen-rich feedstock (i.e., having at or above 40% $H_2$, such as point A, which has about 60% $H_2$). The addition of oxygen results in a product of a new C/H/O composition, shown as point B (having about 50% $H_2$). In one example, the source of $O_2$ is air. In another example, the source of $O_2$ is pure $O_2$.

Figure 5:
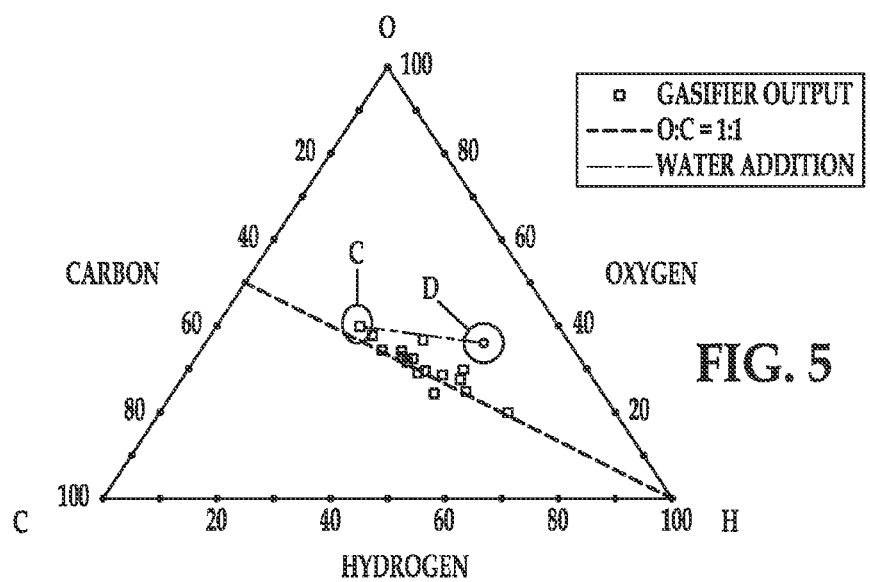
FIG. 5 is a ternary C/H/O diagram illustrating the effect that the addition of $H_2O$ to an H-poor feedstock has on the C/H/O composition of one of the gasifier products towards the H:O point 2:1.

The addition of water alone moves the composition along a line connecting the feedstock composition with the C/H/O composition of water on the ternary diagram. FIG. 5 illustrates the addition of water to a hydrogen-poor feedstock (having less than 40% $H_2$, such as point C, which has about 20% $H_2$). The addition of water results in a product of a new C/H/O composition, shown as point D (e.g., about 50% $H_2$).

As illustrated in FIGS. 4 and 5, the final composition of the products labeled B and D are the same. It is to be understood that any other point plotted in FIGS. 2, 4 and 5 could be moved to the selected final composition by the addition of a mixture of oxygen and water. The addition of both water and oxygen moves the composition towards both the water and pure oxygen points. The ratio of water to oxygen added will alter the composition accordingly.

Referring back to FIG. 1, at reference numeral 108, the feedstock and any co-feeds are allowed to equilibrate prior to removal from the reformer and prior to introduction of the next feedstock and co-feed(s). If the products of each of the varying feedstocks and co-feeds are allowed to equilibrate to the same exit temperature in the catalytic reformer, such products will have the same product species composition. The time for reaching equilibration will depend, at least in part, on the feedstock and co-feeds used, and the exit temperature. In one embodiment, the exit temperature ranges from about 400° C. to about 1200° C.

Determining when equilibrium is reached may be accomplished by obtaining a full composition of the gas, and comparing the composition to a table of expected compositions based on the feed composition and the equilibration temperature. It is believed that the exact point of equilibrium need not be determined if excess catalyst is used, which will allow more than ample time to reach equilibration. The amount of catalyst that constitutes excess is based on the specific catalyst and reformer combination. In one example, a supported-nickel catalyst could be employed to catalyze oxidation and reforming reactions to approach chemical equilibrium. If the complete conversion of the feedstocks to equilibrium products required 100 g of the supported-nickel catalyst, it is believed that 150 g would constitute an excess which would be expected to ensure achievement of equilibrium. It is also believed that characterization of the discrepancy of the gas temperature and the heating temperature may serve as a basis for determining when equilibrium is reached. The chemical reactions involved consume or release energy, which increases or decreases the gas temperature. Once the reactions are complete however, regular heat transfer remains. As such, a constant temperature may be evident of equilibrium.

Since the method disclosed herein utilizes the feedstock atomic composition to determine the amount and type of co-feed to add to achieve a desirable product, varying feedstocks may be introduced and the co-feed may be adjusted for each of the respective feedstocks so that a substantially similar product is consistently achieved (i.e., a constant product composition is obtained).

To further illustrate the present disclosure, an example is given herein. It is to be understood that this example is provided for illustrative purposes and is not to be construed as limiting the scope of the disclosure.

More particularly, the following example is a simulated comparison of a conventional hydrocarbon reforming technique (i.e., the comparative example) to the C/H/O matching technique disclosed herein. The comparative reforming scenario adds oxygen and/or water to the gasifier product in amounts determined from the desired operating O/C and $H_2O/C$ ratios, using the C content of the hydrocarbons in the stream. For example, using an O/C of 1.0 and a $H_2O/C$ of 2.0, then 0.5 moles of $O_2$ and 2 moles of water would be added for each mole of $CH_4$. Similarly, for each mole of $C_2H_4$, 1.0 mole of $O_2$ and 4 moles of water would be added. In contrast, using the C/H/O matching strategy disclosed herein, the amount of oxygen and/or water added would be determined not on the basis of hydrocarbon content, but on the atomic composition of the mixture.

EXAMPLE

Figure 6:
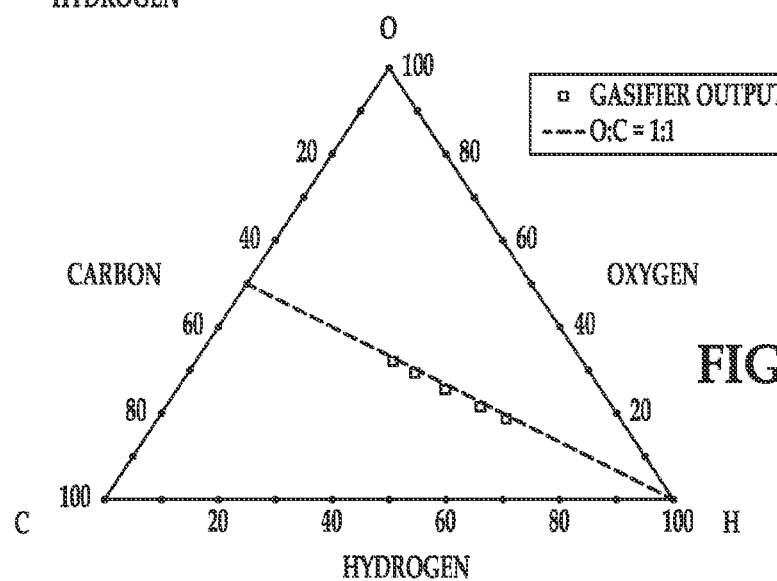
FIG. 6 is a ternary C/H/O diagram illustrating the C/H/O composition of the five streams used in the simulated experiments discussed in the Examples.

The comparative hydrocarbon reforming technique and the C/H/O matching technique were compared using process simulation software (ASPEN) to calculate the exit compositions of the comparative reforming and C/H/O matching strategies for feed streams of different compositions. Table 2 shows the species composition of a typical gasifier product. This stream can be either enriched or depleted in H by the addition of $H_2$ or CO. It is to be understood that the addition of C alone would be experimentally impractical, and would move the product away from equal C and O, which would be unrepresentative of gasifier outputs. Table 3 presents the five stream compositions used in the simulations: the base case; two H-rich streams; and two H-poor streams. The C/H/O compositions of these streams are plotted in FIG. 6.

TABLE 2

Base case gasifier output composition (i.e., feedstock), volume percent.

| Component | Volume percent |
|---|---|
| $H_2$ | 29.0 |
| $CH_4$ | 13.0 |
| $C_2H_4$ | 5.0 |
| CO | 36.0 |
| $CO_2$ | 17.0 |

TABLE 3

Mole fractions of H-rich and H-poor gasifier output streams, based on the base case composition.

| | H-poor 2 (add CO) | H-poor 1 (add CO) | Base | H-rich 1 (add $H_2$) | H-rich 2 (add $H_2$) |
|---|---|---|---|---|---|
| $H_2$ | 0.193 | 0.232 | 0.290 | 0.432 | 0.527 |
| $CH_4$ | 0.87 | 0.104 | 0.130 | 0.104 | 0.87 |
| $C_2H_4$ | 0.33 | 0.40 | 0.50 | 0.40 | 0.33 |
| CO | 0.573 | 0.488 | 0.360 | 0.288 | 0.240 |
| $CO_2$ | 0.113 | 0.136 | 0.170 | 0.136 | 0.113 |
| C | 0.335 | 0.310 | 0.275 | 0.233 | 0.202 |
| H | 0.346 | 0.399 | 0.471 | 0.552 | 0.612 |
| O | 0.319 | 0.291 | 0.254 | 0.215 | 0.186 |

The ASPEN process simulation software was used to compare the equilibrium product compositions of a reactor using the comparative reforming strategy and the C/H/O matching strategy disclosed herein and the feed compositions given in Table 3.

In the calculation, two feed streams were mixed and the equilibrium product composition was calculated for various exit temperatures. For both the comparative autothermal reforming technique and the C/H/O matching technique, one feed stream consisted of 100 moles of gasifier product of a composition given in Table 3. The second feed stream consisted of a mixture of $H_2O$ and air ($O_2/N_2$) in quantities to either (a) achieve a predetermined C/H/O composition (i.e., C/H/O matching example) or (b) achieve a set O/C and $H_2O/C$ ratio based on the hydrocarbon content of the feed (i.e., comparative example). The overall feed mixture to the equilibrium reactor block for the C/H/O and comparative reforming scenarios are given in Tables 4 and 5, respectively.

TABLE 4

Feed compositions (mole fraction) for the comparative reforming scenario (combined feedstock and co-feed).

| Component | Base Case (BC) | 4:1 BC:CO | 2:1 BC:CO | 4:1 BC:$H_2$ | 2:1 BC:$H_2$ |
|---|---|---|---|---|---|
| $H_2$ | 0.193 | 0.165 | 0.145 | 0.308 | 0.394 |
| $CH_4$ | 0.086 | 0.074 | 0.065 | 0.074 | 0.065 |
| $C_2H_4$ | 0.033 | 0.029 | 0.025 | 0.029 | 0.025 |
| CO | 0.239 | 0.348 | 0.429 | 0.205 | 0.180 |
| $CO_2$ | 0.113 | 0.097 | 0.085 | 0.097 | 0.085 |
| $N_2$ | 0.144 | 0.123 | 0.108 | 0.123 | 0.108 |
| $O_2$ | 0.038 | 0.033 | 0.029 | 0.033 | 0.029 |
| $H_2O$ | 0.153 | 0.131 | 0.115 | 0.131 | 0.115 |

TABLE 5

Feed compositions (mole fraction) for the C/H/O matching (combined feedstock and co-feed).

| Component | Base Case (BC) | 4:1 BC:CO | 2:1 BC:CO | 4:1 BC:$H_2$ | 2:1 BC:$H_2$ |
|---|---|---|---|---|---|
| $H_2$ | 0.134 | 0.118 | 0.104 | 0.200 | 0.236 |
| $CH_4$ | 0.060 | 0.053 | 0.046 | 0.048 | 0.039 |
| $C_2H_4$ | 0.023 | 0.020 | 0.018 | 0.019 | 0.015 |
| CO | 0.166 | 0.249 | 0.307 | 0.133 | 0.107 |
| $CO_2$ | 0.078 | 0.069 | 0.061 | 0.063 | 0.051 |
| $N_2$ | 0.237 | 0.097 | 0.000 | 0.336 | 0.436 |
| $O_2$ | 0.063 | 0.026 | 0.000 | 0.089 | 0.116 |
| $H_2O$ | 0.240 | 0.367 | 0.464 | 0.111 | 0.000 |

TABLE 6

Tabulated Simulation Results.

| | Exit Temperature | | | | | |
|---|---|---|---|---|---|---|
| | 500 C. | 600 C. | 700 C. | 800 C. | 900 C. | 1000 C. |
| Comparative Reforming Scenario Base Case | | | | | | |
| Mole Flow lbmol/hr | | | | | | |
| HYDROGEN | 73.02 | 171.66 | 340.56 | 501.26 | 552.77 | 551.81 |
| METHANE | 242.13 | 193.51 | 109.22 | 32.45 | 5.14 | 0.79 |
| ETHYLENE | 0.00 | 0.00 | 0.00 | 0.00 | 0.00 | 0.00 |
| CO | 33.08 | 128.93 | 297.18 | 443.58 | 501.30 | 519.66 |
| CO2 | 327.97 | 280.75 | 196.79 | 127.16 | 96.75 | 82.74 |
| NITROGEN | 171.43 | 171.43 | 171.43 | 171.43 | 171.43 | 171.43 |
| OXYGEN | 0.00 | 0.00 | 0.00 | 0.00 | 0.00 | 0.00 |
| WATER | 141.15 | 139.75 | 139.42 | 132.27 | 135.38 | 145.04 |
| Total Flow lbmol/hr | 988.78 | 1086.03 | 1254.60 | 1408.15 | 1462.76 | 1471.46 |

TABLE 6-continued

Tabulated Simulation Results.

|  | Exit Temperature | | | | | |
|---|---|---|---|---|---|---|
|  | 500 C. | 600 C. | 700 C. | 800 C. | 900 C. | 1000 C. |
| Total Flow lb/hr | 26737.45 | 26737.45 | 26737.45 | 26737.45 | 26737.45 | 26737.45 |
| Total Flow cuft/hr | 201110.94 | 249557.07 | 321342.77 | 397705.61 | 451585.68 | 492954.22 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0738 | 0.1581 | 0.2714 | 0.3560 | 0.3779 | 0.3750 |
| METHANE | 0.2449 | 0.1782 | 0.0871 | 0.0230 | 0.0035 | 0.0005 |
| ETHYLENE | 0.0000 | 0.0000 | 0.0000 | 0.0000 | 0.0000 | 0.0000 |
| CO | 0.0335 | 0.1187 | 0.2369 | 0.3150 | 0.3427 | 0.3532 |
| CO2 | 0.3317 | 0.2585 | 0.1569 | 0.0903 | 0.0661 | 0.0562 |
| NITROGEN | 0.1734 | 0.1579 | 0.1366 | 0.1217 | 0.1172 | 0.1165 |
| OXYGEN | 0.0000 | 0.0000 | 0.0000 | 0.0000 | 0.0000 | 0.0000 |
| WATER | 0.1427 | 0.1287 | 0.1111 | 0.0939 | 0.0926 | 0.0986 |
| Mole fraction (N2-free) | | | | | | |
| HYDROGEN | 0.0893 | 0.1877 | 0.3144 | 0.4053 | 0.4281 | 0.4245 |
| METHANE | 0.2962 | 0.2116 | 0.1008 | 0.0262 | 0.0040 | 0.0006 |
| ETHYLENE | 0.0000 | 0.0000 | 0.0000 | 0.0000 | 0.0000 | 0.0000 |
| CO | 0.0405 | 0.1410 | 0.2744 | 0.3587 | 0.3882 | 0.3997 |
| CO2 | 0.4013 | 0.3070 | 0.1817 | 0.1028 | 0.0749 | 0.0636 |
| OXYGEN | 0.0000 | 0.0000 | 0.0000 | 0.0000 | 0.0000 | 0.0000 |
| WATER | 0.1727 | 0.1528 | 0.1287 | 0.1070 | 0.1048 | 0.1116 |
| C | 0.2506 | 0.2501 | 0.2500 | 0.2478 | 0.2488 | 0.2518 |
| H | 0.4631 | 0.4636 | 0.4637 | 0.4654 | 0.4646 | 0.4621 |
| O | 0.2863 | 0.2863 | 0.2863 | 0.2867 | 0.2866 | 0.2861 |
| Comparative Reforming Scenario H2-Poor 1 | | | | | | |
| Mole Flow lbmol/hr | | | | | | |
| HYDROGEN | 41.43 | 116.42 | 258.73 | 401.97 | 452.63 | 453.36 |
| METHANE | 231.25 | 183.65 | 104.53 | 32.37 | 5.29 | 0.80 |
| ETHYLENE | 0.00 | 0.00 | 0.00 | 0.00 | 0.00 | 0.00 |
| CO | 52.65 | 168.02 | 342.19 | 487.62 | 545.29 | 562.49 |
| CO2 | 357.39 | 289.60 | 194.55 | 121.29 | 90.70 | 77.99 |
| NITROGEN | 137.30 | 137.30 | 137.30 | 137.30 | 137.30 | 137.30 |
| OXYGEN | 0.00 | 0.00 | 0.00 | 0.00 | 0.00 | 0.00 |
| WATER | 54.82 | 75.01 | 90.94 | 92.03 | 95.54 | 103.77 |
| Total Flow lbmol/hr | 874.83 | 970.02 | 1128.25 | 1272.59 | 1326.75 | 1335.72 |
| Total Flow lb/hr | 25830.42 | 25830.42 | 25830.42 | 25830.42 | 25830.42 | 25830.42 |
| Total Flow cuft/hr | 177974.22 | 222924.45 | 288999.48 | 359433.52 | 409608.41 | 447489.26 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0505 | 0.1301 | 0.2494 | 0.3405 | 0.3676 | 0.3680 |
| METHANE | 0.2820 | 0.2052 | 0.1008 | 0.0274 | 0.0043 | 0.0007 |
| ETHYLENE | 0.0000 | 0.0000 | 0.0000 | 0.0000 | 0.0000 | 0.0000 |
| CO | 0.0642 | 0.1877 | 0.3299 | 0.4130 | 0.4429 | 0.4566 |
| CO2 | 0.4358 | 0.3236 | 0.1876 | 0.1027 | 0.0737 | 0.0633 |
| NITROGEN | 0.1674 | 0.1534 | 0.1324 | 0.1163 | 0.1115 | 0.1115 |
| OXYGEN | 0.0000 | 0.0000 | 0.0000 | 0.0000 | 0.0000 | 0.0000 |
| WATER | 0.0627 | 0.0773 | 0.0806 | 0.0723 | 0.0720 | 0.0777 |
| Mole fraction (N2-free) | | | | | | |
| HYDROGEN | 0.0562 | 0.1398 | 0.2611 | 0.3541 | 0.3805 | 0.3783 |
| METHANE | 0.3135 | 0.2205 | 0.1055 | 0.0285 | 0.0044 | 0.0007 |
| ETHYLENE | 0.0000 | 0.0000 | 0.0000 | 0.0000 | 0.0000 | 0.0000 |
| CO | 0.0714 | 0.2018 | 0.3453 | 0.4295 | 0.4584 | 0.4694 |
| CO2 | 0.4846 | 0.3478 | 0.1963 | 0.1068 | 0.0763 | 0.0651 |
| OXYGEN | 0.0000 | 0.0000 | 0.0000 | 0.0000 | 0.0000 | 0.0000 |
| WATER | 0.0743 | 0.0901 | 0.0918 | 0.0811 | 0.0803 | 0.0866 |
| C | 0.2654 | 0.2721 | 0.2777 | 0.2782 | 0.2795 | 0.2825 |
| H | 0.4171 | 0.4108 | 0.4056 | 0.4051 | 0.4038 | 0.4009 |
| O | 0.3176 | 0.3171 | 0.3167 | 0.3167 | 0.3167 | 0.3165 |
| Comparative Reforming Scenario H2-Poor 2 | | | | | | |
| Mole Flow lbmol/hr | | | | | | |
| HYDROGEN | 19.80 | 81.47 | 205.48 | 334.63 | 383.46 | 385.40 |
| METHANE | 215.73 | 171.67 | 98.69 | 31.49 | 5.27 | 0.80 |
| ETHYLENE | 0.00 | 0.00 | 0.00 | 0.00 | 0.00 | 0.00 |

TABLE 6-continued

Tabulated Simulation Results.

| | Exit Temperature | | | | | |
|---|---|---|---|---|---|---|
| | 500 C. | 600 C. | 700 C. | 800 C. | 900 C. | 1000 C. |
| CO | 98.23 | 212.80 | 380.71 | 520.39 | 576.41 | 592.38 |
| CO2 | 351.92 | 281.41 | 186.48 | 114.01 | 84.20 | 72.71 |
| NITROGEN | 114.29 | 114.29 | 114.29 | 114.29 | 114.29 | 114.29 |
| OXYGEN | 0.00 | 0.00 | 0.00 | 0.00 | 0.00 | 0.00 |
| WATER | 13.82 | 40.27 | 62.22 | 67.48 | 71.08 | 78.09 |
| Total Flow lbmol/hr | 813.79 | 901.91 | 1047.87 | 1182.28 | 1234.71 | 1243.66 |
| Total Flow lb/hr | 25190.79 | 25190.79 | 25190.79 | 25190.79 | 25190.79 | 25190.79 |
| Total Flow cuft/hr | 165583.71 | 207289.76 | 268420.24 | 333937.13 | 381201.83 | 416658.29 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0243 | 0.0903 | 0.1961 | 0.2830 | 0.3106 | 0.3099 |
| METHANE | 0.2651 | 0.1903 | 0.0942 | 0.0266 | 0.0043 | 0.0006 |
| ETHYLENE | 0.0000 | 0.0000 | 0.0000 | 0.0000 | 0.0000 | 0.0000 |
| CO | 0.1207 | 0.2359 | 0.3633 | 0.4402 | 0.4668 | 0.4763 |
| CO2 | 0.4324 | 0.3120 | 0.1780 | 0.0964 | 0.0682 | 0.0585 |
| NITROGEN | 0.1404 | 0.1267 | 0.1091 | 0.0967 | 0.0926 | 0.0919 |
| OXYGEN | 0.0000 | 0.0000 | 0.0000 | 0.0000 | 0.0000 | 0.0000 |
| WATER | 0.0170 | 0.0446 | 0.0594 | 0.0571 | 0.0576 | 0.0628 |
| Mole fraction (N2-free) | | | | | | |
| HYDROGEN | 0.0283 | 0.1034 | 0.2201 | 0.3133 | 0.3422 | 0.3413 |
| METHANE | 0.3084 | 0.2180 | 0.1057 | 0.0295 | 0.0047 | 0.0007 |
| ETHYLENE | 0.0000 | 0.0000 | 0.0000 | 0.0000 | 0.0000 | 0.0000 |
| CO | 0.1404 | 0.2702 | 0.4078 | 0.4873 | 0.5145 | 0.5245 |
| CO2 | 0.5031 | 0.3573 | 0.1997 | 0.1068 | 0.0751 | 0.0644 |
| OXYGEN | 0.0000 | 0.0000 | 0.0000 | 0.0000 | 0.0000 | 0.0000 |
| WATER | 0.0198 | 0.0511 | 0.0666 | 0.0632 | 0.0634 | 0.0691 |
| C | 0.2809 | 0.2906 | 0.2991 | 0.3013 | 0.3028 | 0.3058 |
| H | 0.3808 | 0.3709 | 0.3623 | 0.3600 | 0.3584 | 0.3554 |
| O | 0.3383 | 0.3385 | 0.3386 | 0.3387 | 0.3387 | 0.3388 |
| Comparative Reforming Scenario H2-Rich 1 | | | | | | |
| Mole Flow lbmol/hr | | | | | | |
| HYDROGEN | 82.87 | 185.11 | 351.69 | 517.60 | 583.14 | 588.71 |
| METHANE | 228.74 | 186.12 | 110.94 | 37.23 | 6.73 | 1.09 |
| ETHYLENE | 0.00 | 0.00 | 0.00 | 0.00 | 0.00 | 0.00 |
| CO | 21.23 | 89.46 | 223.61 | 352.53 | 409.01 | 425.98 |
| CO2 | 232.58 | 206.96 | 147.99 | 92.79 | 66.81 | 55.48 |
| NITROGEN | 137.30 | 137.30 | 137.30 | 137.30 | 137.30 | 137.30 |
| OXYGEN | 0.00 | 0.00 | 0.00 | 0.00 | 0.00 | 0.00 |
| WATER | 177.12 | 160.12 | 143.90 | 125.40 | 120.88 | 126.57 |
| Total Flow lbmol/hr | 879.84 | 965.08 | 1115.44 | 1262.86 | 1323.86 | 1335.14 |
| Total Flow lb/hr | 21704.23 | 21704.23 | 21704.23 | 21704.23 | 21704.23 | 21704.23 |
| Total Flow cuft/hr | 178918.75 | 221744.70 | 285689.19 | 356659.91 | 408690.94 | 447268.67 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0942 | 0.1918 | 0.3153 | 0.4099 | 0.4405 | 0.4409 |
| METHANE | 0.2600 | 0.1929 | 0.0995 | 0.0295 | 0.0051 | 0.0008 |
| ETHYLENE | 0.0000 | 0.0000 | 0.0000 | 0.0000 | 0.0000 | 0.0000 |
| CO | 0.0241 | 0.0927 | 0.2005 | 0.2792 | 0.3090 | 0.3190 |
| CO2 | 0.2643 | 0.2145 | 0.1327 | 0.0735 | 0.0505 | 0.0416 |
| NITROGEN | 0.1561 | 0.1423 | 0.1231 | 0.1087 | 0.1037 | 0.1028 |
| OXYGEN | 0.0000 | 0.0000 | 0.0000 | 0.0000 | 0.0000 | 0.0000 |
| WATER | 0.2013 | 0.1659 | 0.1290 | 0.0993 | 0.0913 | 0.0948 |
| Mole fraction (N2-free) | | | | | | |
| HYDROGEN | 0.1116 | 0.2236 | 0.3595 | 0.4599 | 0.4915 | 0.4915 |
| METHANE | 0.3081 | 0.2248 | 0.1134 | 0.0331 | 0.0057 | 0.0009 |
| ETHYLENE | 0.0000 | 0.0000 | 0.0000 | 0.0000 | 0.0000 | 0.0000 |
| CO | 0.0286 | 0.1081 | 0.2286 | 0.3132 | 0.3447 | 0.3556 |
| CO2 | 0.3132 | 0.2500 | 0.1513 | 0.0824 | 0.0563 | 0.0463 |
| OXYGEN | 0.0000 | 0.0000 | 0.0000 | 0.0000 | 0.0000 | 0.0000 |
| WATER | 0.2385 | 0.1934 | 0.1471 | 0.1114 | 0.1019 | 0.1057 |
| C | 0.2354 | 0.2297 | 0.2244 | 0.2188 | 0.2175 | 0.2192 |
| H | 0.5273 | 0.5307 | 0.5339 | 0.5372 | 0.5379 | 0.5369 |
| O | 0.2373 | 0.2396 | 0.2417 | 0.2440 | 0.2446 | 0.2439 |

TABLE 6-continued

Tabulated Simulation Results.

| | Exit Temperature | | | | | |
|---|---|---|---|---|---|---|
| | 500 C. | 600 C. | 700 C. | 800 C. | 900 C. | 1000 C. |
| | Comparative Reforming Scenario H2-Rich 2 | | | | | |
| Mole Flow lbmol/hr | | | | | | |
| HYDROGEN | 85.72 | 187.16 | 348.70 | 519.68 | 601.59 | 615.03 |
| METHANE | 220.57 | 183.16 | 116.09 | 44.33 | 9.32 | 1.62 |
| ETHYLENE | 0.00 | 0.00 | 0.00 | 0.00 | 0.00 | 0.00 |
| CO | 13.76 | 61.98 | 168.70 | 284.75 | 342.89 | 360.27 |
| CO2 | 167.26 | 156.46 | 116.81 | 72.51 | 49.38 | 39.71 |
| NITROGEN | 18.57 | 18.57 | 18.57 | 18.57 | 18.57 | 18.57 |
| OXYGEN | 0.00 | 0.00 | 0.00 | 0.00 | 0.00 | 0.00 |
| WATER | 203.31 | 176.70 | 149.29 | 121.82 | 109.94 | 111.91 |
| Total Flow lbmol/hr | 709.20 | 784.02 | 918.15 | 1061.67 | 1131.70 | 1147.10 |
| Total Flow lb/hr | 15640.96 | 15640.96 | 15640.96 | 15640.96 | 15640.96 | 15640.96 |
| Total Flow cuft/hr | 144152.76 | 180109.94 | 235141.40 | 299825.66 | 349349.98 | 384259.46 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.1209 | 0.2387 | 0.3798 | 0.4895 | 0.5316 | 0.5362 |
| METHANE | 0.3110 | 0.2336 | 0.1264 | 0.0418 | 0.0082 | 0.0014 |
| ETHYLENE | 0.0000 | 0.0000 | 0.0000 | 0.0000 | 0.0000 | 0.0000 |
| CO | 0.0194 | 0.0791 | 0.1837 | 0.2682 | 0.3030 | 0.3141 |
| CO2 | 0.2358 | 0.1996 | 0.1272 | 0.0683 | 0.0436 | 0.0346 |
| NITROGEN | 0.0262 | 0.0237 | 0.0202 | 0.0175 | 0.0164 | 0.0162 |
| OXYGEN | 0.0000 | 0.0000 | 0.0000 | 0.0000 | 0.0000 | 0.0000 |
| WATER | 0.2867 | 0.2254 | 0.1626 | 0.1147 | 0.0971 | 0.0976 |
| Mole fraction (N2-free) | | | | | | |
| HYDROGEN | 0.1241 | 0.2445 | 0.3876 | 0.4982 | 0.5405 | 0.5450 |
| METHANE | 0.3194 | 0.2393 | 0.1290 | 0.0425 | 0.0084 | 0.0014 |
| ETHYLENE | 0.0000 | 0.0000 | 0.0000 | 0.0000 | 0.0000 | 0.0000 |
| CO | 0.0199 | 0.0810 | 0.1875 | 0.2730 | 0.3080 | 0.3192 |
| CO2 | 0.2422 | 0.2044 | 0.1298 | 0.0695 | 0.0444 | 0.0352 |
| OXYGEN | 0.0000 | 0.0000 | 0.0000 | 0.0000 | 0.0000 | 0.0000 |
| WATER | 0.2944 | 0.2308 | 0.1660 | 0.1168 | 0.0988 | 0.0992 |
| C | 0.2227 | 0.2132 | 0.2042 | 0.1960 | 0.1927 | 0.1933 |
| H | 0.5842 | 0.5878 | 0.5912 | 0.5942 | 0.5953 | 0.5951 |
| O | 0.1931 | 0.1990 | 0.2046 | 0.2098 | 0.2119 | 0.2116 |
| | C/H/O Matching Scenario Base Case | | | | | |
| Mole Flow lbmol/hr | | | | | | |
| HYDROGEN | 139.92 | 294.78 | 483.86 | 563.55 | 552.92 | 532.75 |
| METHANE | 195.78 | 136.32 | 51.92 | 7.49 | 0.83 | 0.12 |
| ETHYLENE | 0.00 | 0.00 | 0.00 | 0.00 | 0.00 | 0.00 |
| CO | 26.20 | 109.17 | 257.69 | 355.73 | 392.97 | 416.00 |
| CO2 | 381.21 | 357.70 | 293.58 | 239.97 | 209.38 | 187.07 |
| NITROGEN | 407.94 | 407.94 | 407.94 | 407.94 | 407.94 | 407.94 |
| OXYGEN | 0.00 | 0.00 | 0.00 | 0.00 | 0.00 | 0.00 |
| WATER | 397.12 | 361.17 | 340.89 | 350.07 | 374.00 | 395.60 |
| Total Flow lbmol/hr | 1548.16 | 1667.08 | 1835.88 | 1924.74 | 1938.05 | 1939.47 |
| Total Flow lb/hr | 39515.72 | 39515.72 | 39515.72 | 39515.72 | 39515.72 | 39515.72 |
| Total Flow cuft/hr | 314791.13 | 383008.91 | 470174.80 | 543574.94 | 598301.25 | 649740.42 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0904 | 0.1768 | 0.2636 | 0.2928 | 0.2853 | 0.2747 |
| METHANE | 0.1265 | 0.0818 | 0.0283 | 0.0039 | 0.0004 | 0.0001 |
| ETHYLENE | 0.0000 | 0.0000 | 0.0000 | 0.0000 | 0.0000 | 0.0000 |
| CO | 0.0169 | 0.0655 | 0.1404 | 0.1848 | 0.2028 | 0.2145 |
| CO2 | 0.2462 | 0.2146 | 0.1599 | 0.1247 | 0.1080 | 0.0965 |
| NITROGEN | 0.2635 | 0.2447 | 0.2222 | 0.2119 | 0.2105 | 0.2103 |
| OXYGEN | 0.0000 | 0.0000 | 0.0000 | 0.0000 | 0.0000 | 0.0000 |
| WATER | 0.2565 | 0.2167 | 0.1857 | 0.1819 | 0.1930 | 0.2040 |
| Mole fraction (N2-free) | | | | | | |
| HYDROGEN | 0.1227 | 0.2341 | 0.3389 | 0.3715 | 0.3614 | 0.3479 |
| METHANE | 0.1717 | 0.1083 | 0.0364 | 0.0049 | 0.0005 | 0.0001 |
| ETHYLENE | 0.0000 | 0.0000 | 0.0000 | 0.0000 | 0.0000 | 0.0000 |
| CO | 0.0230 | 0.0867 | 0.1805 | 0.2345 | 0.2568 | 0.2716 |

TABLE 6-continued

Tabulated Simulation Results.

| | Exit Temperature | | | | | |
|---|---|---|---|---|---|---|
| | 500 C. | 600 C. | 700 C. | 800 C. | 900 C. | 1000 C. |
| CO2 | 0.3343 | 0.2841 | 0.2056 | 0.1582 | 0.1368 | 0.1221 |
| OXYGEN | 0.0000 | 0.0000 | 0.0000 | 0.0000 | 0.0000 | 0.0000 |
| WATER | 0.3483 | 0.2868 | 0.2387 | 0.2308 | 0.2444 | 0.2583 |
| C | 0.2457 | 0.2354 | 0.2299 | 0.2324 | 0.2390 | 0.2453 |
| H | 0.4330 | 0.4429 | 0.4481 | 0.4457 | 0.4394 | 0.4334 |
| O | 0.3213 | 0.3217 | 0.3220 | 0.3219 | 0.3216 | 0.3213 |
| | C/H/O Matching Scenario H2-Poor 1 | | | | | |
| Mole Flow lbmol/hr | | | | | | |
| HYDROGEN | 135.67 | 290.25 | 491.44 | 593.86 | 588.50 | 567.88 |
| METHANE | 212.95 | 153.87 | 64.66 | 10.58 | 1.22 | 0.18 |
| ETHYLENE | 0.00 | 0.00 | 0.00 | 0.00 | 0.00 | 0.00 |
| CO | 25.26 | 106.97 | 262.64 | 376.55 | 419.36 | 444.13 |
| CO2 | 403.08 | 380.44 | 313.98 | 254.15 | 220.71 | 196.97 |
| NITROGEN | 150.80 | 150.80 | 150.80 | 150.80 | 150.80 | 150.80 |
| OXYGEN | 0.00 | 0.00 | 0.00 | 0.00 | 0.00 | 0.00 |
| WATER | 422.58 | 386.14 | 363.38 | 369.13 | 393.22 | 415.91 |
| Total Flow lbmol/hr | 1350.32 | 1468.47 | 1646.90 | 1755.07 | 1773.79 | 1775.87 |
| Total Flow lb/hr | 33973.74 | 33973.74 | 33973.74 | 33973.74 | 33973.74 | 33973.74 |
| Total Flow cuft/hr | 274449.76 | 337315.31 | 421743.64 | 495631.96 | 547570.20 | 594910.78 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.1462 | 0.2682 | 0.3829 | 0.4285 | 0.4263 | 0.4176 |
| METHANE | 0.2295 | 0.1422 | 0.0504 | 0.0076 | 0.0009 | 0.0001 |
| ETHYLENE | 0.0000 | 0.0000 | 0.0000 | 0.0000 | 0.0000 | 0.0000 |
| CO | 0.0272 | 0.0988 | 0.2046 | 0.2717 | 0.3038 | 0.3266 |
| CO2 | 0.4345 | 0.3515 | 0.2446 | 0.1834 | 0.1599 | 0.1448 |
| NITROGEN | 0.1625 | 0.1393 | 0.1175 | 0.1088 | 0.1092 | 0.1109 |
| OXYGEN | 0.0000 | 0.0000 | 0.0000 | 0.0000 | 0.0000 | 0.0000 |
| WATER | 0.3129 | 0.2630 | 0.2206 | 0.2103 | 0.2217 | 0.2342 |
| Mole fraction (N2-free) | | | | | | |
| HYDROGEN | 0.1131 | 0.2203 | 0.3285 | 0.3702 | 0.3626 | 0.3494 |
| METHANE | 0.1775 | 0.1168 | 0.0432 | 0.0066 | 0.0007 | 0.0001 |
| ETHYLENE | 0.0000 | 0.0000 | 0.0000 | 0.0000 | 0.0000 | 0.0000 |
| CO | 0.0211 | 0.0812 | 0.1755 | 0.2347 | 0.2584 | 0.2733 |
| CO2 | 0.3360 | 0.2887 | 0.2099 | 0.1584 | 0.1360 | 0.1212 |
| OXYGEN | 0.0000 | 0.0000 | 0.0000 | 0.0000 | 0.0000 | 0.0000 |
| WATER | 0.3523 | 0.2930 | 0.2429 | 0.2301 | 0.2423 | 0.2559 |
| C | 0.2470 | 0.2370 | 0.2312 | 0.2327 | 0.2389 | 0.2452 |
| H | 0.4327 | 0.4422 | 0.4478 | 0.4463 | 0.4404 | 0.4345 |
| O | 0.3203 | 0.3208 | 0.3211 | 0.3210 | 0.3207 | 0.3204 |
| | C/H/O Matching Scenario H2-Poor 2 | | | | | |
| Mole Flow lbmol/hr | | | | | | |
| HYDROGEN | 135.91 | 292.45 | 499.85 | 610.67 | 606.63 | 585.11 |
| METHANE | 220.21 | 160.99 | 69.68 | 11.84 | 1.38 | 0.20 |
| ETHYLENE | 0.00 | 0.00 | 0.00 | 0.00 | 0.00 | 0.00 |
| CO | 24.54 | 104.88 | 262.70 | 383.24 | 429.15 | 455.38 |
| CO2 | 421.13 | 400.01 | 333.50 | 270.80 | 235.35 | 210.31 |
| NITROGEN | 7.94 | 7.94 | 7.94 | 7.94 | 7.94 | 7.94 |
| OXYGEN | 0.00 | 0.00 | 0.00 | 0.00 | 0.00 | 0.00 |
| WATER | 455.44 | 417.34 | 392.54 | 397.41 | 422.38 | 446.25 |
| Total Flow lbmol/hr | 1265.16 | 1383.61 | 1566.22 | 1681.90 | 1702.83 | 1705.18 |
| Total Flow lb/hr | 31455.30 | 31455.30 | 31455.30 | 31455.30 | 31455.30 | 31455.30 |
| Total Flow cuft/hr | 257049.41 | 317768.86 | 401053.78 | 474950.89 | 525649.05 | 571217.49 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.1074 | 0.2114 | 0.3191 | 0.3631 | 0.3562 | 0.3431 |
| METHANE | 0.1741 | 0.1164 | 0.0445 | 0.0070 | 0.0008 | 0.0001 |
| ETHYLENE | 0.0000 | 0.0000 | 0.0000 | 0.0000 | 0.0000 | 0.0000 |
| CO | 0.0194 | 0.0758 | 0.1677 | 0.2279 | 0.2520 | 0.2671 |
| CO2 | 0.3329 | 0.2891 | 0.2129 | 0.1610 | 0.1382 | 0.1233 |
| NITROGEN | 0.0063 | 0.0057 | 0.0051 | 0.0047 | 0.0047 | 0.0047 |
| OXYGEN | 0.0000 | 0.0000 | 0.0000 | 0.0000 | 0.0000 | 0.0000 |
| WATER | 0.3600 | 0.3016 | 0.2506 | 0.2363 | 0.2480 | 0.2617 |

TABLE 6-continued

Tabulated Simulation Results.

| | Exit Temperature | | | | | |
|---|---|---|---|---|---|---|
| | 500 C. | 600 C. | 700 C. | 800 C. | 900 C. | 1000 C. |
| Mole fraction (N2-free) | | | | | | |
| HYDROGEN | 0.1081 | 0.2126 | 0.3208 | 0.3648 | 0.3579 | 0.3447 |
| METHANE | 0.1752 | 0.1170 | 0.0447 | 0.0071 | 0.0008 | 0.0001 |
| ETHYLENE | 0.0000 | 0.0000 | 0.0000 | 0.0000 | 0.0000 | 0.0000 |
| CO | 0.0195 | 0.0762 | 0.1686 | 0.2289 | 0.2532 | 0.2683 |
| CO2 | 0.3350 | 0.2908 | 0.2140 | 0.1618 | 0.1389 | 0.1239 |
| OXYGEN | 0.0000 | 0.0000 | 0.0000 | 0.0000 | 0.0000 | 0.0000 |
| WATER | 0.3623 | 0.3034 | 0.2519 | 0.2374 | 0.2492 | 0.2629 |
| C | 0.2480 | 0.2378 | 0.2316 | 0.2329 | 0.2391 | 0.2455 |
| H | 0.4293 | 0.4390 | 0.4449 | 0.4437 | 0.4377 | 0.4316 |
| O | 0.3228 | 0.3232 | 0.3234 | 0.3234 | 0.3232 | 0.3229 |
| | | | C/H/O Matching Scenario H2-Rich 1 | | | |
| Mole Flow lbmol/hr | | | | | | |
| HYDROGEN | 124.52 | 258.73 | 415.10 | 473.53 | 463.35 | 447.11 |
| METHANE | 159.58 | 108.15 | 38.53 | 5.17 | 0.57 | 0.08 |
| ETHYLENE | 0.00 | 0.00 | 0.00 | 0.00 | 0.00 | 0.00 |
| CO | 22.89 | 94.40 | 216.49 | 291.50 | 320.11 | 338.29 |
| CO2 | 300.08 | 280.00 | 227.52 | 185.88 | 161.87 | 144.18 |
| NITROGEN | 576.99 | 576.99 | 576.99 | 576.99 | 576.99 | 576.99 |
| OXYGEN | 0.00 | 0.00 | 0.00 | 0.00 | 0.00 | 0.00 |
| WATER | 318.24 | 286.89 | 269.75 | 278.03 | 297.43 | 314.64 |
| Total Flow lbmol/hr | 1502.30 | 1605.16 | 1744.39 | 1811.11 | 1820.32 | 1821.29 |
| Total Flow lb/hr | 38555.43 | 38555.43 | 38555.43 | 38555.43 | 38555.43 | 38555.43 |
| Total Flow cuft/hr | 305557.32 | 368836.01 | 446772.96 | 511504.43 | 561975.32 | 610165.51 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0829 | 0.1612 | 0.2380 | 0.2615 | 0.2545 | 0.2455 |
| METHANE | 0.1062 | 0.0674 | 0.0221 | 0.0029 | 0.0003 | 0.0000 |
| ETHYLENE | 0.0000 | 0.0000 | 0.0000 | 0.0000 | 0.0000 | 0.0000 |
| CO | 0.0152 | 0.0588 | 0.1241 | 0.1609 | 0.1759 | 0.1857 |
| CO2 | 0.1997 | 0.1744 | 0.1304 | 0.1026 | 0.0889 | 0.0792 |
| NITROGEN | 0.3841 | 0.3595 | 0.3308 | 0.3186 | 0.3170 | 0.3168 |
| OXYGEN | 0.0000 | 0.0000 | 0.0000 | 0.0000 | 0.0000 | 0.0000 |
| WATER | 0.2118 | 0.1787 | 0.1546 | 0.1535 | 0.1634 | 0.1728 |
| Mole fraction (N2-free) | | | | | | |
| HYDROGEN | 0.1346 | 0.2516 | 0.3556 | 0.3837 | 0.3727 | 0.3593 |
| METHANE | 0.1725 | 0.1052 | 0.0330 | 0.0042 | 0.0005 | 0.0001 |
| ETHYLENE | 0.0000 | 0.0000 | 0.0000 | 0.0000 | 0.0000 | 0.0000 |
| CO | 0.0247 | 0.0918 | 0.1854 | 0.2362 | 0.2575 | 0.2719 |
| CO2 | 0.3243 | 0.2723 | 0.1949 | 0.1506 | 0.1302 | 0.1159 |
| OXYGEN | 0.0000 | 0.0000 | 0.0000 | 0.0000 | 0.0000 | 0.0000 |
| WATER | 0.3439 | 0.2790 | 0.2311 | 0.2253 | 0.2392 | 0.2529 |
| C | 0.2421 | 0.2312 | 0.2256 | 0.2283 | 0.2348 | 0.2408 |
| H | 0.4453 | 0.4553 | 0.4604 | 0.4579 | 0.4520 | 0.4464 |
| O | 0.3126 | 0.3135 | 0.3140 | 0.3138 | 0.3133 | 0.3127 |
| | | | C/H/O Matching Scenario H2-Rich 2 | | | |
| Mole Flow lbmol/hr | | | | | | |
| HYDROGEN | 109.22 | 223.52 | 345.17 | 377.79 | 365.99 | 352.16 |
| METHANE | 125.00 | 80.10 | 24.45 | 2.79 | 0.30 | 0.04 |
| ETHYLENE | 0.00 | 0.00 | 0.00 | 0.00 | 0.00 | 0.00 |
| CO | 21.74 | 87.04 | 188.01 | 242.01 | 263.79 | 278.64 |
| CO2 | 254.85 | 234.45 | 189.14 | 156.80 | 137.51 | 122.91 |
| NITROGEN | 773.03 | 773.03 | 773.03 | 773.03 | 773.03 | 773.03 |
| OXYGEN | 0.00 | 0.00 | 0.00 | 0.00 | 0.00 | 0.00 |
| WATER | 249.52 | 225.02 | 214.68 | 225.37 | 242.16 | 256.50 |
| Total Flow lbmol/hr | 1533.36 | 1623.16 | 1734.47 | 1777.78 | 1782.77 | 1783.28 |
| Total Flow lb/hr | 40200.90 | 40200.90 | 40200.90 | 40200.90 | 40200.90 | 40200.90 |
| Total Flow cuft/hr | 311958.12 | 373020.04 | 444260.11 | 502112.48 | 550403.50 | 597449.15 |
| Temperature F. | 932.00 | 1112.00 | 1292.00 | 1472.00 | 1652.00 | 1832.00 |
| Pressure psia | 73.48 | 73.48 | 73.48 | 73.48 | 73.48 | 73.48 |
| Mole fraction | | | | | | |
| HYDROGEN | 0.0712 | 0.1377 | 0.1990 | 0.2125 | 0.2053 | 0.1975 |
| METHANE | 0.0815 | 0.0493 | 0.0141 | 0.0016 | 0.0002 | 0.0000 |

TABLE 6-continued

Tabulated Simulation Results.

| | Exit Temperature | | | | | |
|---|---|---|---|---|---|---|
| | 500 C. | 600 C. | 700 C. | 800 C. | 900 C. | 1000 C. |
| ETHYLENE | 0.0000 | 0.0000 | 0.0000 | 0.0000 | 0.0000 | 0.0000 |
| CO | 0.0142 | 0.0536 | 0.1084 | 0.1361 | 0.1480 | 0.1563 |
| CO2 | 0.1662 | 0.1444 | 0.1090 | 0.0882 | 0.0771 | 0.0689 |
| NITROGEN | 0.5041 | 0.4762 | 0.4457 | 0.4348 | 0.4336 | 0.4335 |
| OXYGEN | 0.0000 | 0.0000 | 0.0000 | 0.0000 | 0.0000 | 0.0000 |
| WATER | 0.1627 | 0.1386 | 0.1238 | 0.1268 | 0.1358 | 0.1438 |
| Mole fraction (N2-free) | | | | | | |
| HYDROGEN | 0.1436 | 0.2629 | 0.3590 | 0.3760 | 0.3625 | 0.3486 |
| METHANE | 0.1644 | 0.0942 | 0.0254 | 0.0028 | 0.0003 | 0.0000 |
| ETHYLENE | 0.0000 | 0.0000 | 0.0000 | 0.0000 | 0.0000 | 0.0000 |
| CO | 0.0286 | 0.1024 | 0.1955 | 0.2409 | 0.2612 | 0.2758 |
| CO2 | 0.3352 | 0.2758 | 0.1967 | 0.1561 | 0.1362 | 0.1217 |
| OXYGEN | 0.0000 | 0.0000 | 0.0000 | 0.0000 | 0.0000 | 0.0000 |
| WATER | 0.3282 | 0.2647 | 0.2233 | 0.2243 | 0.2398 | 0.2539 |
| C | 0.2432 | 0.2328 | 0.2287 | 0.2329 | 0.2400 | 0.2463 |
| H | 0.4350 | 0.4449 | 0.4488 | 0.4448 | 0.4381 | 0.4321 |
| O | 0.3218 | 0.3223 | 0.3225 | 0.3223 | 0.3220 | 0.3217 |

Summary of C/H/O Matching Results

Figure 7:
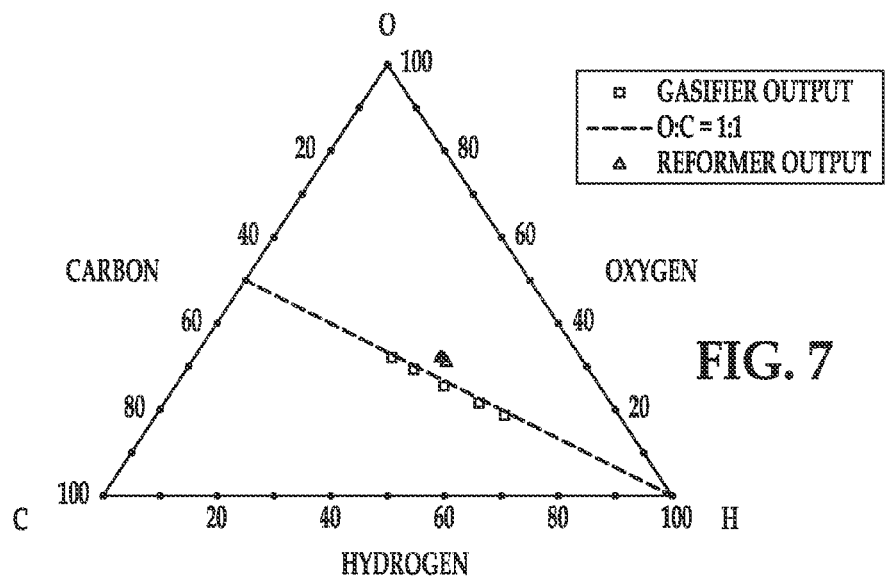
FIG. 7 is a ternary diagram illustrating the C/H/O compositions of the feedstock and the reformer output of the five streams under a C/H/O matching reforming scenario.
Figure 8:
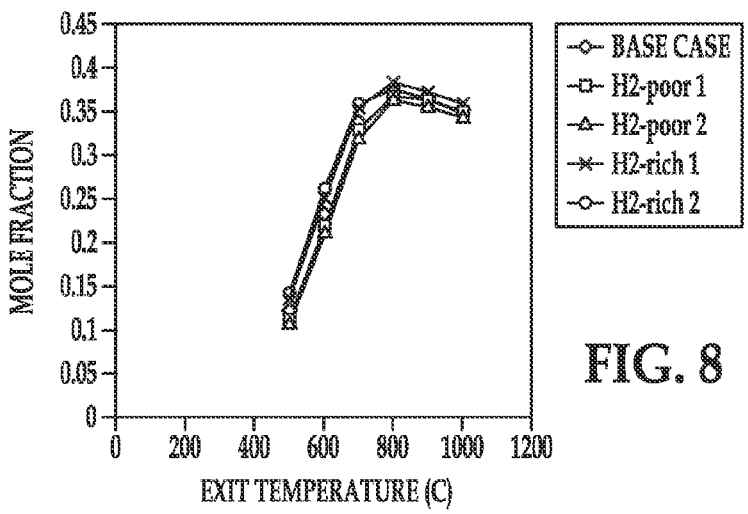
FIG. 8 is a graph illustrating the $H_2$ mole fraction ($N_2$-free basis) as a function of exit temperature for each feed case after C/H/O matching reforming.
Figure 9:
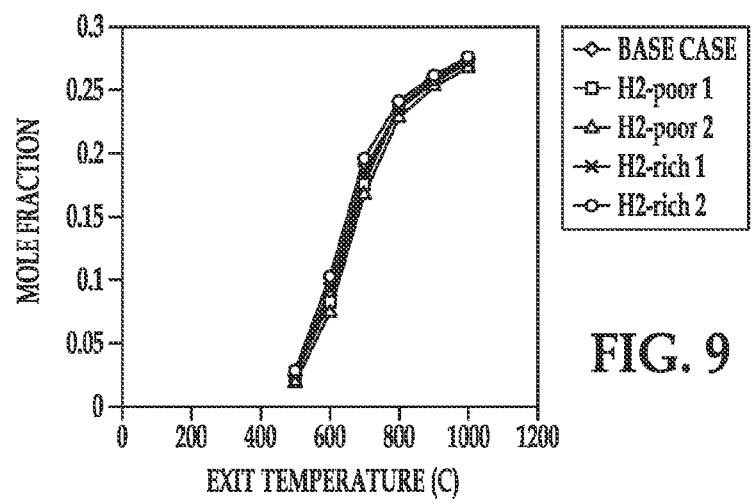
FIG. 9 is a graph illustrating the CO mole fraction ($N_2$-free basis) as a function of exit temperature for each feed case after C/H/O matching reforming.
Figure 10:
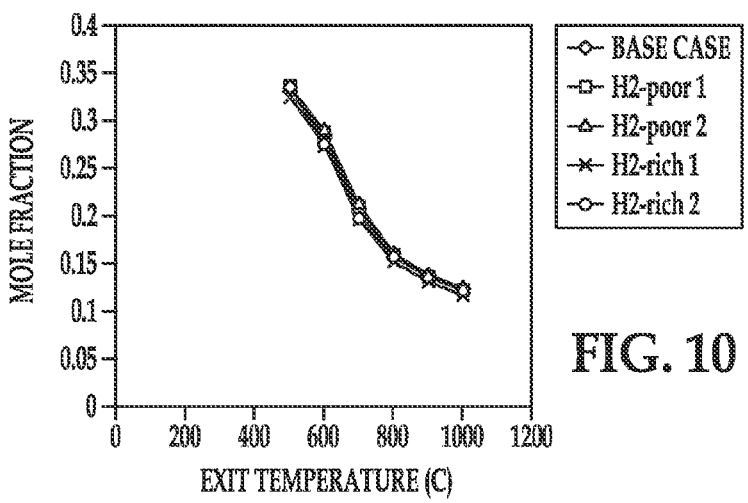
FIG. 10 is a graph illustrating the $CO_2$ mole fraction ($N_2$-free basis) as a function of exit temperature for each feed case after C/H/O matching reforming.

The equilibrium product composition for the C/H/O matching scenario (i.e., the feed streams in shown Table 5) was calculated using ASPEN. FIG. 7 shows the feed and product C/H/O positions. Using this strategy, the $O_2$ and $H_2O$ quantities were adjusted to achieve a particular C/H/O atomic composition. The resulting products converge to a single, small region of the C/H/O diagram. FIG. 8 presents the $H_2$ mole fraction ($N_2$-free basis) as a function of reformer exit temperature. In contrast with the results from the comparative autothermal reforming (see, e.g., FIG. 12), the $H_2$ mole fraction of the products formed via the C/H/O matching scenario shows very little variation from feed stream to feed stream. FIGS. 9 and 10 present the CO and $CO_2$ mole fractions (N2-free basis), respectively. As with $H_2$, the CO and $CO_2$ mole fractions of the products generated via the C/H/O matching scenario are virtually unchanged by changing the feed stream composition.

Summary of Comparative Example Results

Figure 11:
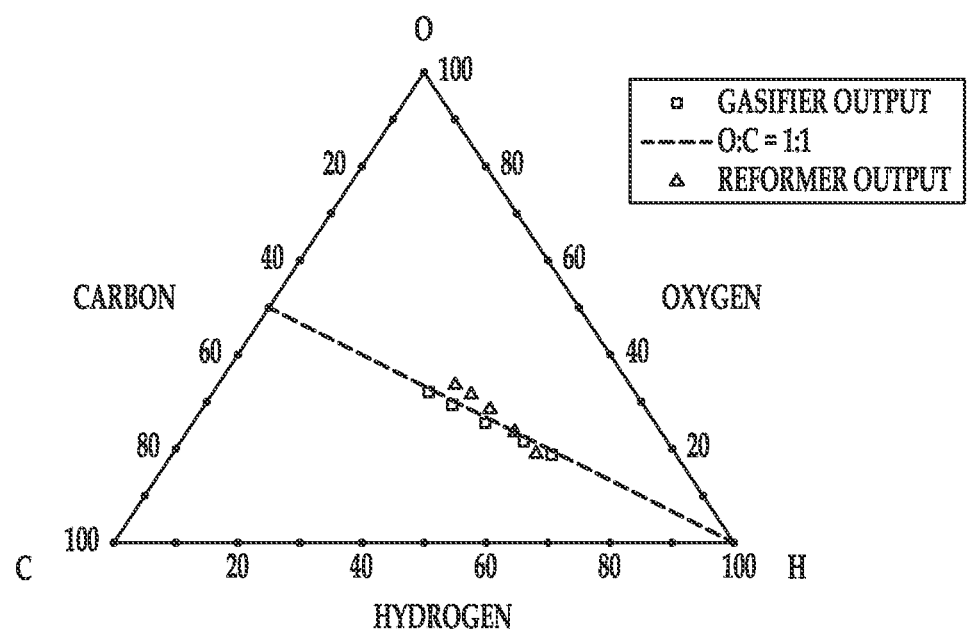
FIG. 11 is a ternary diagram illustrating the C/H/O compositions of the feedstock (i.e., gasifier output) and the reformer output of the five streams under an autothermal reforming scenario.
Figure 12:
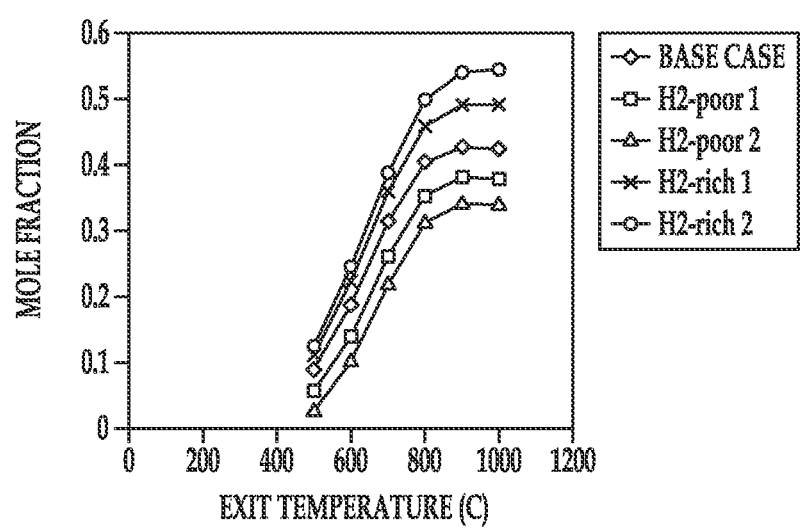
FIG. 12 is a graph illustrating the $H_2$ mole fraction as a function ($N_2$-free basis) of exit temperature for each feed case after autothermal reforming using O/C=0.5 and $H_2O$/C=1.0.
Figure 13:
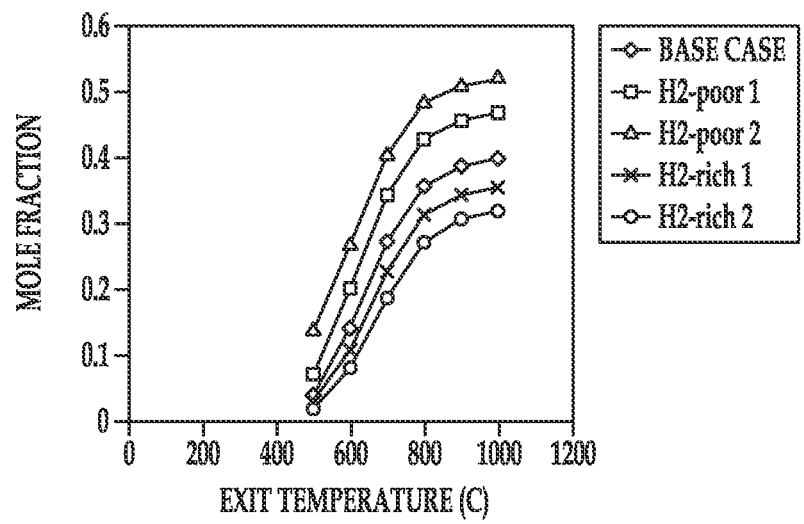
FIG. 13 is a graph illustrating the CO mole fraction ($N_2$-free basis) as a function of exit temperature for each feed case after autothermal reforming using O/C=0.5 and $H_2O$/C=1.0.
Figure 14:
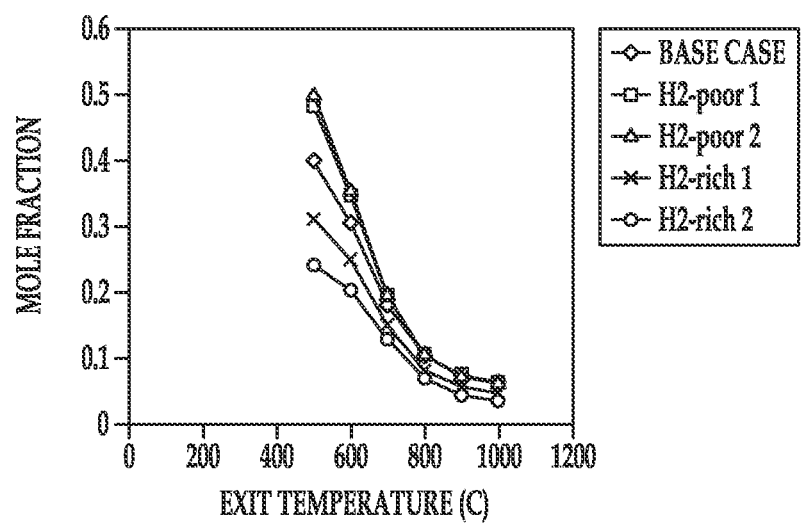
FIG. 14 is a graph illustrating the $CO_2$ mole fraction ($N_2$-free basis) as a function of exit temperature for each feed case after autothermal reforming using O/C=0.5 and $H_2O$/C=1.0.

The equilibrium reformer output composition for the comparative autothermal reforming scenario (i.e., feed streams shown in Table 4) was also calculated using ASPEN. The $O_2$ and $H_2O$ quantities were adjusted to achieve an O/C ratio of 0.5 and a $H_2O$/C ratio of 1.0 (based on C in $CH_4$ and $C_2H_4$). The C/H/O positions of the gasifier outputs (i.e., the feedstocks) and reformer outputs are shown in FIG. 11. Note that there is no convergence of the C/H/O position of the different gasifier output streams. FIG. 12 shows the $H_2$ mole fraction of the equilibrium reformer product (on a N2-free basis) at various exit temperatures, while FIGS. 13 and 14 show the CO and $CO_2$ mole fractions. At a given exit temperature, there are significant differences in the $H_2$, CO, and $CO_2$ content of the product. The $H_2$-rich feed streams remain $H_2$-rich after reforming; and similarly, the $H_2$-poor streams remain $H_2$-poor.

As discussed herein, in a catalytic reformer, the exit composition is driven towards chemical equilibrium. In the method disclosed herein, the species composition of the equilibrium product is not determined by the feedstock species composition, but rather by the atomic composition and energy content of the feedstock. The present inventors have recognized that gasifier products from widely varied feedstocks have variation in the H content (while O:C is approximately 1:1). As such, the overall atomic composition may be used to set $O_2$ and/or $H_2O$ co-feeds, as opposed to basing such feeds on hydrocarbon content. Coupled with sufficient reaction times to reach equilibrium, the method disclosed herein results in a reformer output with significantly reduced species variation as compared to conventional reforming approaches. Therefore, a constant exit composition may be achieved from the catalytic reformer with a varying feedstock composition by adding co-reactants/feeds, such as water and/or oxygen, to the feedstock, allowing sufficient contact time with the catalyst to reach equilibrium, and controlling the reformer exit temperature to a constant value.

It is further to be understood that the ranges provided herein include the stated range and any value or sub-range within the stated range. For example, a range from about 400° C. to about 1200° C. should be interpreted to include not only the explicitly recited limits of about 400° C. to about 1200° C., but also to include individual values, such as 400° C., 450° C., 525° C., 700° C., 835° C., 980° C., etc., and sub-ranges, such as from about 450° C. to about 1100° C., from about 500° C. to about 1000° C., etc.

While several examples have been described in detail, it will be apparent to those skilled in the art that the disclosed examples may be modified. Therefore, the foregoing description is to be considered non-limiting.

What is claimed is:

1. A catalytic reforming method, comprising:
   determining a C/H/O atomic composition for each of a plurality of feedstocks by:
   assuming an atomic composition of O:C that is 1:1 for each of the plurality of feedstocks;
   measuring a heat capacity or a thermal conductivity of each of the plurality of feedstocks; and
   determining, from the measured heat capacity or thermal conductivity, an atomic composition of H for each of the plurality of feedstocks;
   sequentially supplying a plurality of feedstocks of variable compositions to a reformer; and
   adding a respective predetermined co-reactant to each of the plurality of feedstocks to obtain a substantially constant output from the reformer for the plurality of feedstocks, the respective predetermined co-reactant being based on the C/H/O atomic composition for a respective one of the plurality of feedstocks and a predetermined C/H/O atomic composition for the substantially constant output.

2. The catalytic reforming method as defined in claim 1 wherein the co-reactant is selected from $H_2O$, $O_2$, and combinations thereof.

3. The catalytic reforming method as defined in claim 2, further comprising selecting $O_2$ as the respective predetermined co-reactant when one of the plurality of feedstocks is a hydrogen-rich feedstock and the substantially constant output from the reformer for the plurality of feedstocks has a hydrogen atomic percent that is less than a hydrogen atomic percent of the hydrogen-rich feedstock.

4. The catalytic reforming method as defined in claim 2, further comprising selecting $H_2O$ as the respective predetermined co-reactant when one of the plurality of feedstocks is a hydrogen-poor feedstock and the substantially constant output from the reformer for the plurality of feedstocks has a hydrogen atomic percent that is greater than a hydrogen atomic percent of the hydrogen-poor feedstock.

5. The catalytic reforming method as defined in claim 2 wherein air is selected as a source of $O_2$.

6. The catalytic reforming method as defined in claim 1, further comprising selecting a ratio of $H_2O$ to $O_2$ as the respective predetermined co-reactant.

7. The catalytic reforming method as defined in claim 1, further comprising continuously feeding the plurality of feedstocks such that introduction of an other of the plurality of feedstocks to the reformer forces the substantially constant output out of the reformer.

8. The catalytic reforming method as defined in claim 1, further comprising allowing one of the plurality of feedstocks, having added thereto the respective predetermined co-reactant, to equilibrate to a predetermined exit temperature in the reformer to form the substantially constant output prior to introducing an other of the plurality of feedstocks to the reformer.

9. The catalytic reforming method as defined in claim 8, further comprising controlling the predetermined exit temperature to a constant value ranging from about 400° C. to about 1200° C.

10. The catalytic reforming method as defined in claim 1, further comprising altering an amount of the respective predetermined co-reactant for at least some of the plurality of feedstocks.

11. A catalytic reforming method, comprising:
determining a C/H/O atomic composition for each of a first feedstock and a second feedstock by:
assuming an atomic composition of O:C that is 1:1 for each of the first feedstock and the second feedstock;
measuring a heat capacity or a thermal conductivity of each of the first feedstock and the second feedstock; and
determining, from the measured heat capacity or thermal conductivity, an atomic composition of H for each of the first feedstock and the second feedstock;
wherein the C/H/O atomic composition of the second feedstock is different from the C/H/O atomic composition of the first feedstock;
introducing the first feedstock into a reformer;
introducing a stream of any of $H_2O$ or $O_2$ with the first feedstock, a composition of the stream of any of $H_2O$ or $O_2$ being based on the C/H/O atomic composition for the first feedstock and a predetermined C/H/O atomic composition for a substantially constant reformer output;
allowing the stream of the any of $H_2O$ or $O_2$ and the first feedstock to reach equilibrium, thereby generating a product having the predetermined C/H/O atomic composition;
removing the product having the predetermined C/H/O composition from the reformer;
introducing the second feedstock into the reformer;
introducing a second stream of any of $H_2O$ or $O_2$ with the second feedstock, a composition of the second stream of the any of $H_2O$ or $O_2$ being based on the C/H/O atomic composition for the second feedstock and the predetermined C/H/O atomic composition for the substantially constant reformer output; and
allowing the second stream of the at any of $H_2O$ or $O_2$ and the second feedstock to reach equilibrium, thereby generating a second product having the predetermined C/H/O atomic composition.

12. The method as defined in claim 11 wherein the introducing of the first feedstock and the introducing of the stream of any of $H_2O$ or $O_2$ occurs simultaneously, and wherein the introducing of the second feedstock and the introducing of the second stream of the any of $H_2O$ or $O_2$ occurs simultaneously.

* * * * *